United States Patent
Jess

(10) Patent No.: US 8,874,867 B2
(45) Date of Patent: Oct. 28, 2014

(54) IDENTIFICATION AND CONTAINMENT OF PERFORMANCE HOT-SPOTS IN VIRTUAL VOLUMES

(75) Inventor: Martin Jess, Erie, CO (US)

(73) Assignee: LSI Corporation, San Jose, CA (US)

(*) Notice: Subject to any disclaimer, the term of this patent is extended or adjusted under 35 U.S.C. 154(b) by 882 days.

(21) Appl. No.: 12/313,593

(22) Filed: Nov. 21, 2008

(65) Prior Publication Data

US 2010/0131733 A1    May 27, 2010

(51) Int. Cl.
*G06F 12/08* (2006.01)
*G06F 3/06* (2006.01)

(52) U.S. Cl.
CPC .......... *G06F 3/0647* (2013.01); *G06F 3/0611* (2013.01); *G06F 3/0631* (2013.01); *G06F 3/0649* (2013.01); *G06F 3/0665* (2013.01); *G06F 3/0689* (2013.01)
USPC ...................................................... 711/165

(58) Field of Classification Search
CPC ... G06F 3/0611; G06F 3/0631; G06F 3/0647; G06F 3/0649; G06F 3/0665; G06F 3/0689
USPC ...................................................... 711/165
See application file for complete search history.

(56) References Cited

U.S. PATENT DOCUMENTS

| | | | |
|---|---|---|---|
| 6,145,067 A * | 11/2000 | Kuwata | 711/165 |
| 6,728,831 B1 * | 4/2004 | Bridge | 711/112 |
| 6,874,061 B1 * | 3/2005 | Bridge | 711/114 |
| 7,185,163 B1 | 2/2007 | Knight et al. | |
| 7,191,304 B1 * | 3/2007 | Cameron et al. | 711/202 |
| 7,363,453 B1 | 4/2008 | Arnan et al. | |
| 7,565,487 B2 * | 7/2009 | Taguchi et al. | 711/114 |
| 7,603,529 B1 * | 10/2009 | MacHardy et al. | 711/162 |
| 7,711,916 B2 * | 5/2010 | Chandrasekaran et al. | 711/165 |
| 7,730,259 B2 * | 6/2010 | Taguchi et al. | 711/114 |
| 7,886,111 B2 * | 2/2011 | Klemm et al. | 711/114 |
| 8,380,674 B1 * | 2/2013 | Bolen et al. | 707/657 |
| 2004/0225662 A1 | 11/2004 | Nojima | |

(Continued)

FOREIGN PATENT DOCUMENTS

EP      1158395 A2    11/2001
JP      200358326      2/2003

(Continued)

OTHER PUBLICATIONS

EMC2; EMC Symmetrix Optimizer; http://www.emc.com/products/detail/software/symmetric-optimizer.htm; printed Dec. 8, 2009; EMC Corporation 2009.

*Primary Examiner* — Aimee Li
*Assistant Examiner* — Ramon A Mercado
(74) *Attorney, Agent, or Firm* — Suiter Swantz pc llo

(57) ABSTRACT

A method includes provisioning a virtual volume from at least one storage pool of a storage array, designating at least one virtual volume segment of the virtual volume for mapping a virtual volume range to a virtual drive range, organizing the virtual volume range into a plurality of clusters, measuring a data load on each of the plurality of clusters and comparing the data load on each of the plurality of clusters to activity of the virtual volume, and reconfiguring the at least one virtual volume segment to contain a hot-spot.

20 Claims, 3 Drawing Sheets

(56) References Cited

U.S. PATENT DOCUMENTS

| | | |
|---|---|---|
| 2006/0010290 A1 | 1/2006 | Sasamoto |
| 2006/0075191 A1* | 4/2006 | Lolayekar et al. ............ 711/114 |
| 2006/0095706 A1 | 5/2006 | Aoyama |
| 2006/0259686 A1* | 11/2006 | Sonobe ........................ 711/114 |
| 2007/0130423 A1* | 6/2007 | Liu et al. ...................... 711/114 |
| 2007/0266053 A1 | 11/2007 | Ahal et al. |
| 2008/0077762 A1 | 3/2008 | Scott et al. |

FOREIGN PATENT DOCUMENTS

| | | |
|---|---|---|
| JP | 2004272324 | 9/2004 |
| JP | 200624024 | 1/2006 |
| JP | 2006127143 | 5/2006 |
| JP | 200779787 | 3/2007 |
| TW | 245989 B | 12/2005 |
| TW | 263903 B | 10/2006 |
| WO | WO2008126202 A1 | 10/2008 |

\* cited by examiner

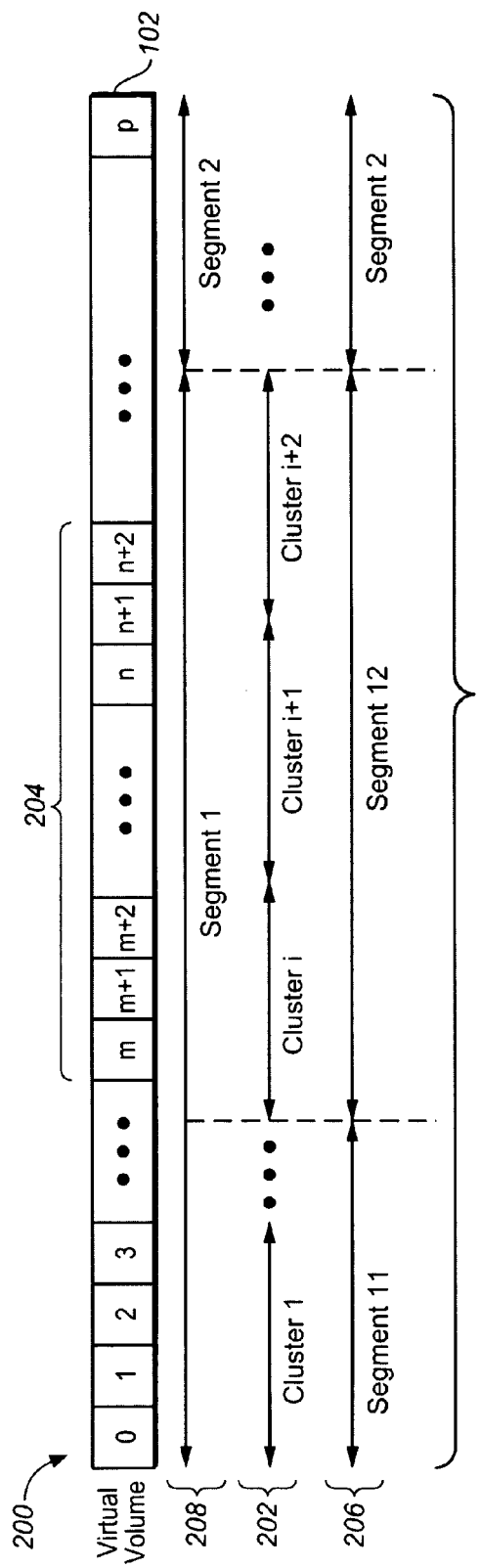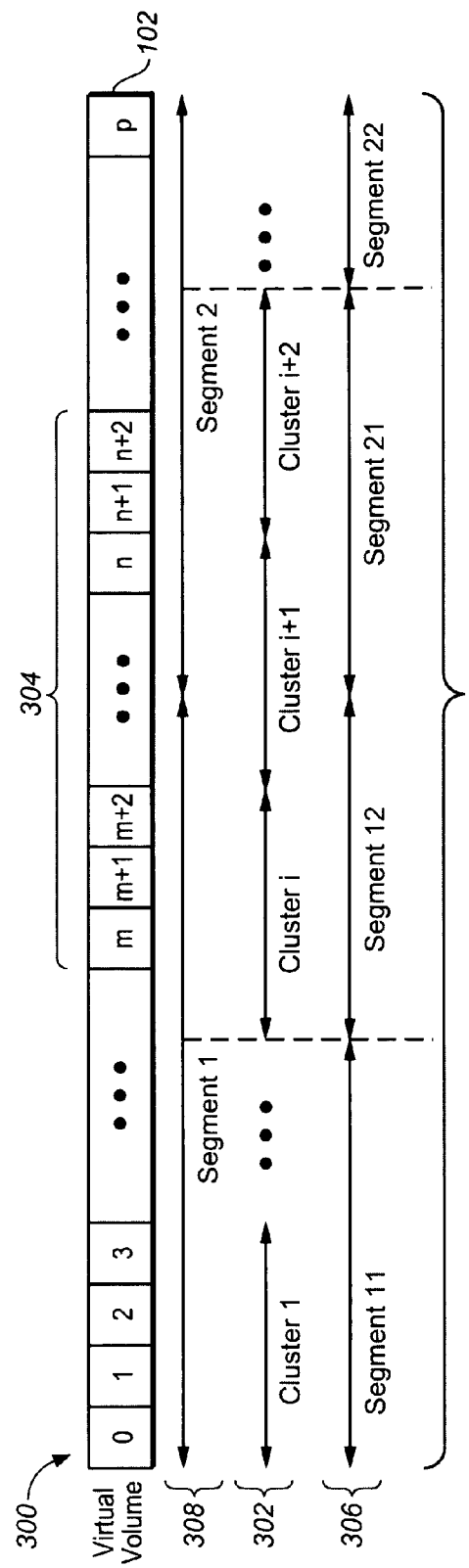

US 8,874,867 B2

IDENTIFICATION AND CONTAINMENT OF PERFORMANCE HOT-SPOTS IN VIRTUAL VOLUMES

TECHNICAL FIELD

The present disclosure generally relates to the field of storage systems, and more particularly to methods for partitioning data loads in virtual volumes.

BACKGROUND

A storage system may group storage devices into tiers based on various characteristics, including performance, cost, and the like. Data may be stored in the grouped storage devices to utilize specific capabilities of the storage devices. Such grouping may be referred to as storage tiering or storage tiers. A storage array may comprise multiple storage tiers with significantly difference performance characteristics. For instance, higher performing storage tiers typically include relatively expensive storage devices such as Solid State Drives (SSDs), whereas lower performing storage tiers typically include relatively cheap storage devices such as Serial ATA (SATA) Hard Disk Drives (HDDs). A user may prefer the higher performing storage tiers to contain data with a high load/activity, whereas the remaining data may be stored in the lower performing storage tiers.

SUMMARY

A method for identifying and containing performance hot-spots in virtual volumes includes provisioning a virtual volume from at least one storage pool of a storage array, designating at least one virtual volume segment of the virtual volume for mapping a virtual volume range to a virtual drive range, organizing the virtual volume range into a plurality of clusters, measuring a data load on each of the plurality of clusters and comparing the data load on each of the plurality of clusters to activity of the virtual volume. A data load exceeding a threshold of activity may be defined as a hot-spot. The method further includes reconfiguring the at least one virtual volume segment to contain the hot-spot.

A computer-readable medium having computer-executable instructions for performing a method for partitioning data loads in virtual volumes includes provisioning a virtual volume from at least one storage pool of a storage array, designating at least one virtual volume segment of the virtual volume for mapping a virtual volume range to a virtual drive range, organizing the virtual volume range into a plurality of clusters, measuring a data load on each of the plurality of clusters and comparing the data load on each of the plurality of clusters to activity of the virtual volume. A data load exceeding a threshold of activity is defined as a hot-spot. The method further includes reconfiguring the at least one virtual volume segment to contain the hot-spot.

A method for identifying and containing performance hot-spots in virtual volumes includes provisioning at least one virtual volume from at least one storage pool of a storage array and designating at least one virtual volume segment of the at least one virtual volume for mapping a virtual volume range to a virtual drive range. The virtual volume range comprises a plurality of clusters. The method further includes measuring a data load on each of the plurality of clusters and comparing the data load on each of the plurality of clusters to activity of the at least one virtual volume. A data load exceeding a threshold of activity is defined as a hot-spot. The method additionally includes reconfiguring the at least one virtual volume segment to contain the hot-spot and transferring the at least one virtual volume segment to a corresponding storage pool.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 2 is a block diagram of another virtual volume segmentation of a storage array including a plurality of clusters;

FIG. 3 is a block diagram of a further virtual volume segmentation of a storage array;

DETAILED DESCRIPTION

Reference will now be made in detail to the subject matter disclosed, which is illustrated in the accompanying drawings.

Figure 1A:
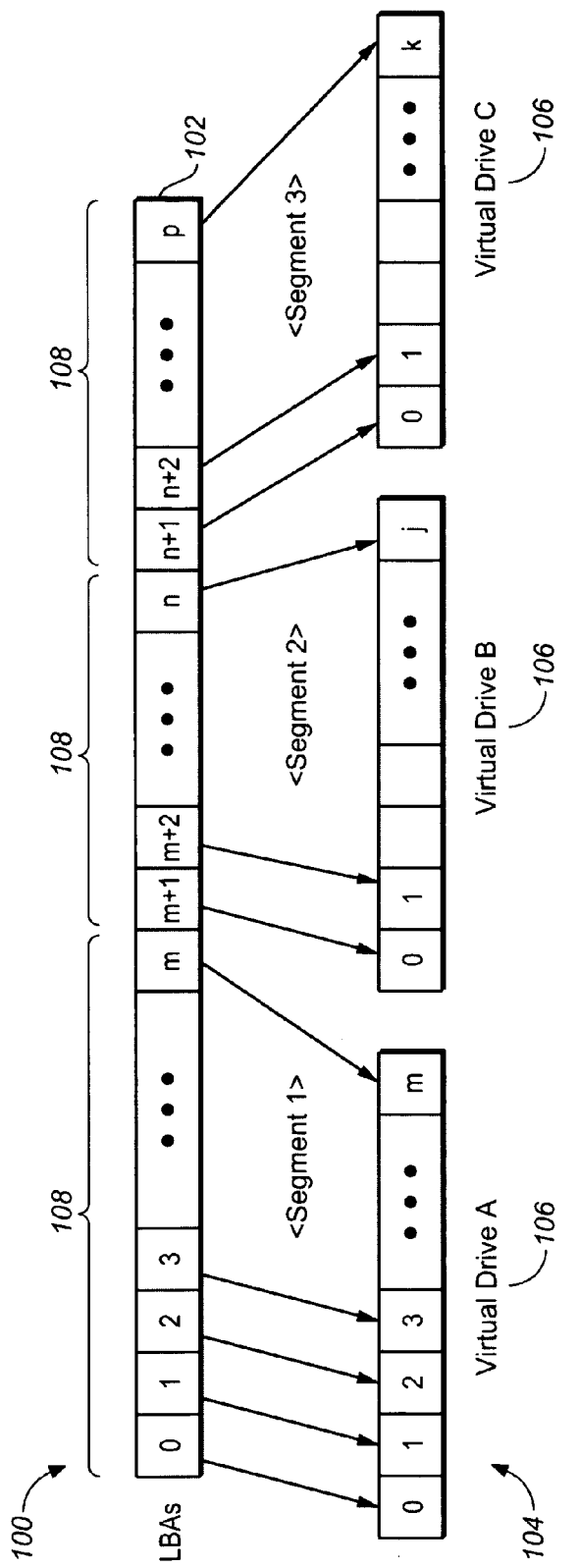
FIG. 1A displays a block diagram of a virtual volume segmentation of a storage array.
Figure 1B:
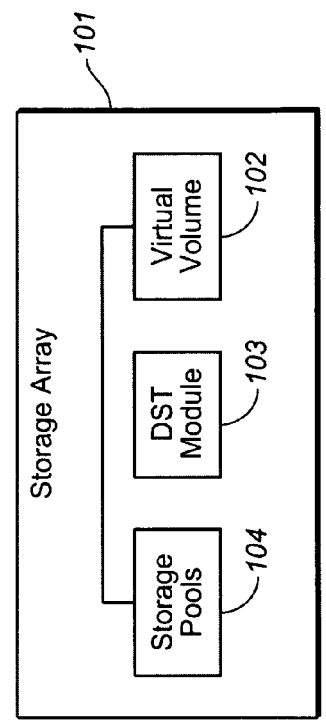
FIG. 1B displays a block diagram of a storage array

Referring to FIGS. 1A and 1B, a block diagram of a virtual volume segmentation 100 of a storage array and a block diagram of a storage array 101 are displayed. In a storage array, a host visible small computer system interface (SCSI) Logical Unit (LU) may be mapped to a virtual volume 102, for instance, when a storage virtualization manager (SVM) is deployed in the storage array. Virtual volume 102 may be derived from a capacity of one or more storage pools 104 in the storage array 101. The one or more storage pools 104 may correspond to a storage tier of the storage array 101. For example, each storage pool 104 may correspond to one storage tier of the storage array 101. Storage pools 104 may include one or more virtual drives 106. In a particular embodiment, virtual drives 106 correspond to redundant array of independent disks (RAID) volumes. When virtual volume 102 is derived from storage pools 104, a virtual volume segment 108 is created for each mapping of a virtual volume logical block address (LBA) range to a virtual drive LBA range. It is appreciated that any number of virtual volume segments 108 may be utilized to map virtual volume 102 to virtual drives 106, thus the depiction of three virtual volume segments 108 in FIG. 1 is not limiting. Note that the virtual volume LBA range may be completely mapped to virtual drive LBA ranges, i.e., the virtual volume may be fully provisioned. This mapping may require one or more segments to cover all the LBAs of the virtual volume. The grouping of virtual volume segments 108 of virtual volume 102 may be referred to as a virtual volume segment configuration.

A Dynamic Storage Tiering (DST) module 103 of the storage array may be used to dynamically move data to optimal storage tiers as loads on the storage array 101 vary throughout a given period. For example, as specific data are accessed frequently during peak periods, the DST module 103 may move the data to higher performing storage tiers. As the load decreases after the peak period (i.e., during a non-peak period), the DST module 103 may move the data back to lower performing storage tiers. Further, the DST module 103 may identify performance hot-spots (e.g., LBA ranges experiencing high loads/activity) in virtual volume 102 and reconfigure virtual volume segments 108 to ensure each performance hot-spot is contained in one or more virtual volume segments 108. The virtual volume segments 108 may then be moved to appropriate corresponding storage pools 104. For instance, virtual volume segments 108 containing performance hot-spots may be transferred to storage pools 104 which correspond to high performing storage tiers. How the DST module 103 accomplishes the above-mentioned tasks will be discussed in detail below.

A performance hot-spot of virtual volume 102 may be contained in a single virtual volume segment 108 (as depicted in FIG. 2) or may span multiple virtual volume segments 108 (as depicted in FIG. 3). In one embodiment of the present disclosure, the virtual volume segments 108 may be subdivided to provide a relatively small base size in order to contain the size of a performance hot-spot. Thus, when a virtual volume segment 108 containing a performance hot-spot is transferred to a corresponding storage pool 104, the amount of data moved may be substantially limited to that of the performance hot-spot. Where a performance hot-spot is relatively large, multiple virtual volume segments 108 and/or subdivided segments may be utilized to contain the performance hot-spot.

Referring now to FIGS. 2 and 3, block diagrams of virtual volume segmentations 200, 300 of a storage array are displayed. As described above, a virtual volume 102 may be segmented into virtual volume segments 208, 308 for mapping a virtual volume range to a virtual drive range. The virtual volume range may be further organized by a plurality of clusters 202, 302. In one embodiment, the clusters 202, 302 are smaller than the virtual volume segments 208, 308, such that, for example, a virtual volume segment 208, 308 may comprise multiple clusters 202, 302. The clusters 202, 302 may be organized such that each cluster is of a substantially equivalent size. For instance, clusters 202, 302 may be defined as a certain percentage or proportion of the overall virtual volume 102 capacity, or may be defined by a fixed size, such as a fixed number of bytes. Alternatively, clusters 202, 302 may be of a varying size without departing from the scope of the disclosure. A minimum size of clusters 202, 302 may be defined by the storage array, which may influence the total number of clusters 202, 302 available on the virtual volume 102.

The storage array may measure the data load/activity on each cluster of the plurality of clusters 202, 302 on a continuous or on-going basis. For example, performance statistics may be collected and/or tracked for each individual cluster within the plurality of clusters 202, 302. To identify performance hot-spots, the data load/activity that was measured for an individual cluster may be compared to the activity of the virtual volume 102 as a whole. In one embodiment, the data load/activity that was measured for an individual cluster may be compared to the average data load on the virtual volume 102. Alternatively, the data load/activity that was measured for an individual cluster may be compared to the activity of multiple virtual volumes, for instance, when many virtual volumes are managed by a DST module. Further, the data load/activity that was measured for an individual cluster may be compared to adjacent clusters or to other clusters within one or more virtual volumes. Where a data load on an individual cluster exceeds a threshold value, that cluster may contain a performance hot-spot, either in whole or in part. The storage array may assign a threshold value to a particular virtual volume. The performance hot-spot exceeds the threshold value and may span one or more clusters. Thus, a cluster or a plurality of adjacent clusters with activity that exceed an assigned threshold may indicate a performance hot-spot within virtual volume 102. Further, multiple performance hot-spots may be present in the storage array at one time, for example, as dictated by multiple clusters 202, 302 spaced apart which exceed the threshold, or by different groupings of adjacent clusters exceeding the threshold.

Upon identifying the hot-spots, the virtual volume segments 208, 308 may be reconfigured (i.e., the virtual volume segment configuration may be changed) to contain the hot-spot within one or more virtual volume segments 208, 308. For example, where more than one virtual volume segment 208, 308 is required to contain a hot-spot, other virtual volume segments 208, 308 may be used, such as when adjacent each other. Referring to FIG. 2, a hot-spot 204 is contained within a single virtual volume segment (segment 1). In this instance, the virtual volume segment 208 may be subdivided into sub-segments 206, such as to reduce the size of the segment to be moved to a corresponding storage pool. Segment 1 is divided into two sub-segments, namely segment 11 and segment 12. Segment 12 is comprised of multiple clusters, which in this exemplary description are clusters i, i+1, and i+2. Since the hot-spot 204 is contained entirely within segment 12 via clusters i, i+1, and i+2, segment 12 may be moved to a corresponding storage pool. For instance, the corresponding storage pool may correspond to a high-performing storage tier.

In an alternative embodiment, a hot-spot may span multiple virtual volume segments. Referring to FIG. 3, a hot-spot 304 spans two virtual volume segments (segments 1 and 2). In this instance, the virtual volume segments 308 may each be subdivided into sub-segments 306, such as to reduce the sizes of any segments to be moved to a corresponding storage pool. Segment 1 is divided into two sub-segments, namely segment 11 and segment 12, whereas segment 2 is divided into two sub-segments, namely segment 21 and segment 22. In this exemplary embodiment, the hot-spot is contained within segments 12 and 21. Clusters i, i+1, and i+2 comprise the combination of segments 12 and 21, and therefore contain the hot-spot. Accordingly, segments 12 and 21 may be moved to a corresponding storage pool. For instance, the corresponding storage pool may correspond to a high-performing storage tier. Where more than one segment is to be moved to a storage pool (such as when a hot-spot spans more than one virtual volume segment), the segments may be combined into a single segment. In an embodiment, the segments are combined into a single segment upon transfer to the storage pool.

It is contemplated that multiple performance hot-spots may be present within a virtual volume 102. The above disclosure may be utilized for identifying and containing the multiple performance hot-spots within virtual volume segments, which are transferred to storage pools of a storage array.

Figure 4:
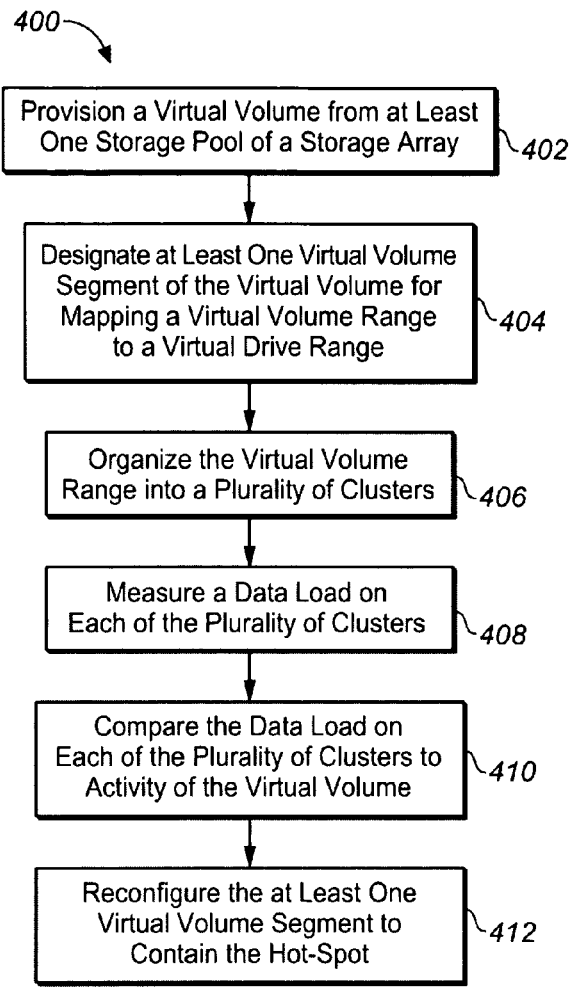
FIG. 4 is a flow chart illustrating a method for identifying and containing performance hot-spots.

Referring now to FIG. 4, a flow chart is displayed illustrating a method 400 for identifying and containing performance hot-spots in virtual volumes. Method 400 may derive a virtual volume from at least one storage pool of a storage array 402. Method 400 may designate at least one virtual volume segment of the virtual volume for mapping a virtual volume range to a virtual drive range 404. Method 400 may organize the virtual volume range into a plurality of clusters 406. Method 400 may measure a data load on each of the plurality of clusters 408. Method 400 may compare the data load on each of the plurality of clusters to activity of the virtual volume 410. A data load exceeding a threshold of activity may be defined as a hot-spot. Method 400 may reconfigure the at least one virtual volume segment to contain the hot-spot 412.

Figure 5:
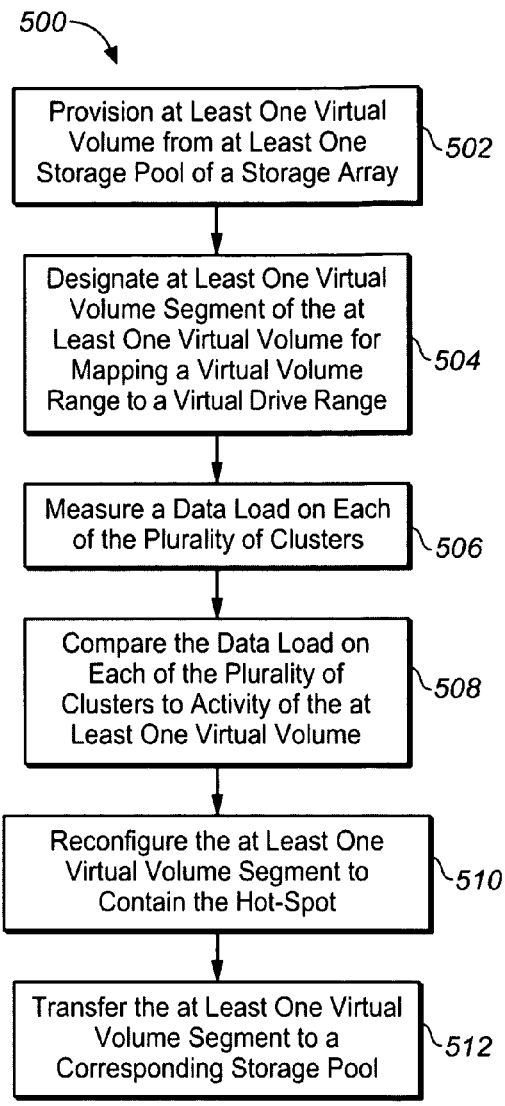
FIG. 5 is a flow chart illustrating a method for identifying and containing performance hot-spots.

Measuring a data load on each of the plurality of clusters of method 400 may include collecting performance statistics for each of the plurality of clusters. Each of the plurality of clusters may be defined as at least one of a proportion of the virtual volume or a fixed size. The at least one virtual volume segment may include a plurality of sub-segments. Method 400 may further include transferring at least one of the plurality of sub-segments to a storage pool of the storage array. The at least one of the plurality of sub-segments may contain the hot-spot. The at least one of the plurality of sub-segments may include a multiple of one of the plurality of clusters Referring now to FIG. 5, a flow chart is displayed illustrating an alternative method 500 for identifying and containing performance hot-spots in virtual volumes. Method 500 may derive a virtual volume from at least one storage pool of a storage array 502. Method 500 may designate at least one virtual volume segment of the virtual volume for mapping a virtual volume range to a virtual drive range 504. The virtual volume may comprise a plurality of clusters. The virtual volume may be fully provisioned. Method 500 may measure a data load on each of the plurality of clusters 506. Method 500 may compare the data load on each of the plurality of clusters to activity of the virtual volume 508. A data load that exceeds a threshold of activity may be defined as a hot-spot. Method 500 may reconfigure the at least one virtual volume segment to contain the hot-spot 510. Method 500 may transfer the at least one virtual volume segment to a corresponding storage pool 512.

The corresponding storage pool of method 500 may correspond to a high-performing storage tier. The high-performing storage tier may be a solid state drive. The steps of measuring a data load on each of the plurality of clusters, comparing the data load on each of the plurality of clusters to activity of the at least one virtual volume, reconfiguring the at least one virtual volume segment to contain the hot-spot, and transferring the at least one virtual volume segment to a corresponding storage pool of method 500 may be performed on a continuous basis. Method 500 may further include combining the at least one virtual volume segment into a single virtual volume segment once transferred to the corresponding storage pool. A plurality of hot-spots may be defined and stored in a plurality of virtual volume segments.

In the present disclosure, the methods disclosed may be implemented as sets of instructions or software readable by a device. Such a software package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for managing a storage array, the storage array including a plurality of storage pools including at least a first storage pool and a second storage pool, each of the plurality of storage pools including at least one storage volume, each of the least one storage volume including a plurality of virtual volume segments, each of the plurality of virtual volume segments including at least one cluster, the method comprising:

measuring data loads on each of a plurality of clusters of the at least one virtual volume of the first storage pool;

determining that one or more clusters of the plurality of clusters of the at least one virtual volume of the first storage pool have measured data loads which exceed a threshold of activity;

designating the one or more clusters of the plurality of clusters as one or more hot-spots upon determining that the one or more clusters of the plurality of clusters of the at least one virtual volume of the first storage pool have measured data loads which exceed the threshold of activity;

reconfiguring one or more particular virtual volume segments to contain the one or more hot-spots; and transferring the one or more particular virtual volume segments, which contain the one or more clusters having been designated as the one or more hot-spots, from the first storage pool to the second storage pool, wherein the second storage pool is associated with a storage tier having a higher performance relative to a storage tier associated with the first storage pool.

2. The method of claim 1, wherein measuring data loads on each of a plurality of clusters of the at least one virtual volume of the first storage pool includes collecting performance statistics for each of the plurality of clusters.

3. The method of claim 1, wherein each of the plurality of clusters is defined as at least one of a proportion of the at least one virtual volume or a fixed size.

4. The method of claim 1, wherein each of the plurality of virtual volume segments includes a plurality of sub-segments.

5. The method of claim 4, wherein each of the plurality of sub-segments includes more than one cluster.

6. The method of claim 1, wherein any virtual volume segment of the first storage pool that does not contain a cluster designated as the one or more hot-spots remains in the first storage pool.

7. The method of claim 1, wherein the second storage pool is implemented on one or more solid state drives.

8. The method of claim 1, wherein the first storage pool is implemented on one or more hard disk drive devices and wherein the second storage pool is implemented on one or more solid state drives.

9. A non-transitory computer-readable medium having computer-executable instructions for performing a method for managing a storage array, the storage array including a plurality of storage pools including at least a first storage pool and a second storage pool, each of the plurality of storage pools including at least one storage volume, each of the least one storage volume including a plurality of virtual volume segments, each of the plurality of virtual volume segments including at least one cluster, said method comprising:

measuring data loads on each of a plurality of clusters of the at least one virtual volume of the first storage pool;

determining that one or more clusters of the plurality of clusters of the at least one virtual volume of the first storage pool have measured data loads which exceed a threshold of activity;

designating the one or more clusters of the plurality of clusters as one or more hot-spots upon determining that the one or more clusters of the plurality of clusters of the at least one virtual volume of the first storage pool have measured data loads which exceed the threshold of activity;

reconfiguring one or more particular virtual volume segments to contain the one or more hot-spots; and transferring the one or more particular virtual volume segments, which contain the one or more clusters having been designated as the one or more hot-spots, from the first storage pool to the second storage pool, wherein the second storage pool is associated with a storage tier having a higher performance relative to a storage tier associated with the first storage pool.

10. The non-transitory computer-readable medium of claim 9, wherein measuring data loads on each of a plurality of clusters of the at least one virtual volume of the first storage pool includes collecting performance statistics for each of the plurality of clusters.

11. The non-transitory computer-readable medium of claim 9, wherein each of the plurality of clusters is defined as at least one of a proportion of the at least one virtual volume or a fixed size.

12. The non-transitory computer-readable medium of claim 9, wherein each of the plurality of virtual volume segments includes a plurality of sub-segments.

13. The non-transitory computer-readable medium of claim 12, wherein each of the plurality of sub-segments includes more than one cluster.

14. The non-transitory computer-readable medium of claim 9, wherein any virtual volume segment of the first storage pool that does not contain a cluster designated as the one or more hot-spots remains in the first storage pool.

15. The non-transitory computer-readable medium of claim 9, wherein the second storage pool is implemented on one or more solid state drives.

16. The non-transitory computer-readable medium of claim 9, wherein the first storage pool is implemented on one or more hard disk drive devices and wherein the second storage pool is implemented on one or more solid state drives.

17. A method for managing a storage array, the storage array including a plurality of storage pools including at least a first storage pool and a second storage pool, each of the plurality of storage pools including at least one storage volume, each of the least one storage volume including a plurality of virtual volume segments, each the plurality of virtual volume segments including a plurality of sub-segments, each of the plurality of sub-segments including at least one cluster, the method comprising:

measuring data loads on each of a plurality of clusters of the at least one virtual volume of the first storage pool;

determining that one or more clusters of the plurality of clusters of the at least one virtual volume of the first storage pool have measured data loads which exceed a threshold of activity;

designating the one or more clusters of the plurality of clusters as one or more hot-spots upon determining that the one or more clusters of the plurality of clusters of the at least one virtual volume of the first storage pool have measured data loads which exceed the threshold of activity;

reconfiguring one or more particular sub-segments to contain the one or more hot-spots; and transferring the one or more particular sub-segments, which contain the one or more clusters having been designated as the one or more hot-spots, from the first storage pool to the second storage pool, wherein the second storage pool is associated with a storage tier having a higher performance relative to a storage tier associated with the first storage pool.

18. The method of claim 17, wherein the steps of measuring data loads on each of a plurality of clusters of the at least one virtual volume of the first storage pool; determining that one or more clusters of the plurality of clusters of the at least one virtual volume of the first storage pool have measured data loads which exceed a threshold of activity; designating the one or more clusters of the plurality of clusters as one or more hot-spots; and transferring one or more particular sub-segments, which contain the one or more clusters having been designated as the one or more hot-spots, from the first storage pool to the second storage pool are performed on a continuous basis.

19. The method of claim 17, wherein any sub-segment of the first storage pool that does not contain a cluster designated as the one or more hot-spots remains in the first storage pool.

20. The method of claim 17, wherein the first storage pool is implemented on one or more hard disk drive devices and wherein the second storage pool is implemented on one or more solid state drives.

* * * * *